United States Patent [19]

Fornasiero et al.

[11] 3,749,839

[45] July 31, 1973

[54] TDM TELECOMMUNICATION SYSTEM FOR TRANSMITTING DATA OR TELEGRAPHIC SIGNALS

[75] Inventors: Paolo Fornasiero; Sergio Tomasi, both of Milan, Italy

[73] Assignee: Societa Italiana Telecommunicazioni Siemens, S.p.A., Milan, Italy

[22] Filed: Dec. 27, 1971

[21] Appl. No.: 212,514

[30] Foreign Application Priority Data

Dec. 24, 1970 Italy ............................. 33528 A/70

[52] U.S. Cl....... 179/15 BA, 179/15 A, 179/15 AF, 179/15 BV

[51] Int. Cl. ............................................... H04j 3/06

[58] Field of Search ................... 179/15 AF, 15 BV, 179/15 BA, 15 BS, 15 A

[56] References Cited

UNITED STATES PATENTS

| | | | |
|---|---|---|---|
| 3,652,802 | 3/1972 | Schellenberg | 179/15 AF |
| 3,504,287 | 3/1970 | Deregnaucourt | 179/15 AF |
| 3,535,450 | 10/1970 | Vollmeyer | 179/15 BA |
| 3,591,722 | 7/1971 | Palsa | 179/15 BA |

*Primary Examiner*—Kathleen H. Claffy
*Assistant Examiner*—David L. Stewart
*Attorney*—Karl F. Ross

[57] ABSTRACT

At a multiplexing terminal of a telecommunication channel, a plurality of access units form composite words from interleaved bits or multibit characters of messages concurrently received over respective groups of incoming lines, the bits emanating from each access unit having a cadence $m_i v_o$ individual to that unit. A switching circuit cyclically samples a set of group registers in which the words from the respective access units are at least partially stored, thereby establishing a frame which consists of a sequence of $m_i$ bits from each unit along with address bits and supplemental bits. A frame counter at the multiplexing terminal determines the completion of a superframe composed of a predetermined number of frames so chosen that all the words are restarted in their original time position within the first frame of each new superframe. An associated demultiplexing terminal comprises a similar switching circuit which directs the individual bit sequences of each frame to respective distributing units while another frame counter establishes the instants at which a word allocated to any distributing unit starts and ends, thereby enabling that unit to divide the word into its constituent characters for retransmission over corresponding outgoing lines. Synchronization of the counters at the two stations is facilitated by the periodic substitution of a special code for the address bits of a frame, the frames so marked recurring a whole number of times within each superframe.

10 Claims, 7 Drawing Figures

TDM TELECOMMUNICATION SYSTEM FOR TRANSMITTING DATA OR TELEGRAPHIC SIGNALS

Figure 1:
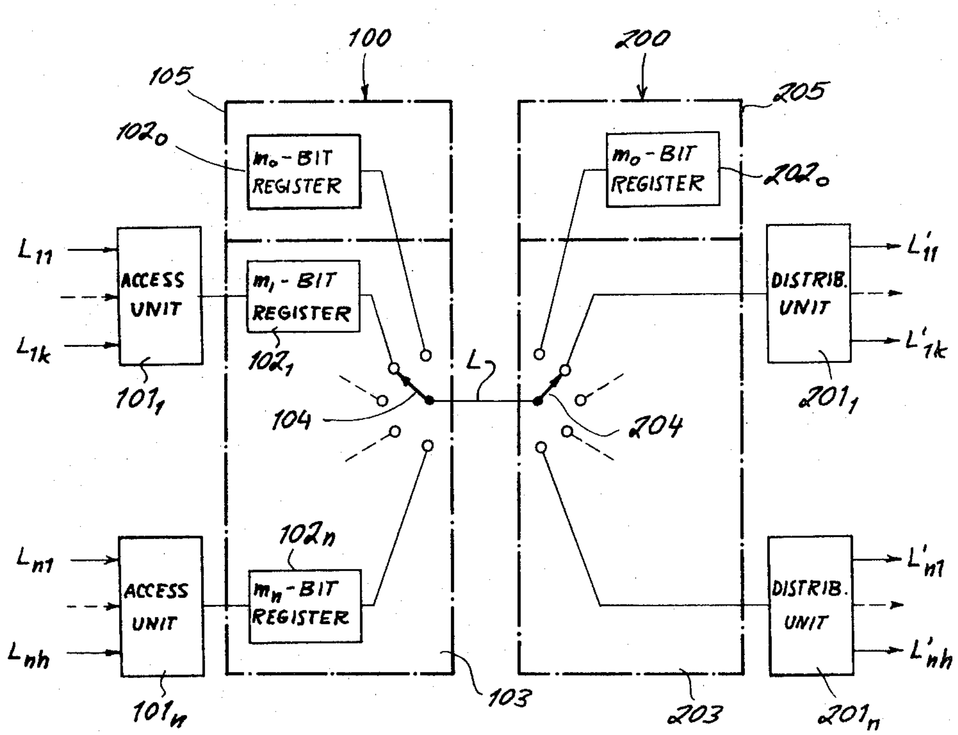

Our present invention relates to a time-division-multiplex (TDM) telecommunication system serving for the transmission of pulse-code-modulation messages, such as telegraphic signals or data, that do not require the maintenance of precise synchronism for intelligibility.

In conventional systems of this type, the binary message signals arriving at a multiplexing terminal over different incoming channels are interleaved either bit by bit or character by character, this process necessitating a close correlation between the transmission speeds or bit cadences of the several feeder channels. The object of our present invention is to provide an improved system in which the need for such correlation is greatly reduced and which therefore can be more universally applied for efficient message transmission from a multiplicity of sources to as many destinations.

In accordance with the present invention, the incoming channels terminating at a multiplexing station are divided into $n$ groups, the channels of each group operating at the same cadence or transmission speed, i.e., number of bits per second; the individual transmission speeds of the several groups may or may not differ from one another and from a predetermined base rate $v_o$. At the terminal of which the multiplexing station forms part, the messages of each group are conventionally interleaved (e.g., bit by bit or character by character) in an individual collector or access unit from which the bits of the resulting composite words are read out at an increased speed $m_i v_o$ where $m_i$ is a multiplication factor individual to each unit. A frame period fixedly related to base rate $v_o$ encompasses a sequence of $m_i$ bits from each unit together with an address code of $m_0$ bits. To produce such a frame, the outputs of the several access units are cyclically read by a scanner for transmission over the common path leading to the associated demultiplexing terminal. At the latter station, these composite words are reconstituted and allocated to respective distributing units which are the counterparts of the access units and operate in conventional manner to deliver the constituent portions of each word to the outgoing channels assigned to them.

The operation of the scanner is controlled by a timer emitting a train of clock pulses at the multiplexing terminal, a similar timer synchronized with it in any known manner being used at the demultiplexing terminal to control the distribution of the outgoing messages. Thus, the several sequences of $m_0, m_1 \ldots m_n$ bits making up a frame may be measured by as many clock cycles and may be supplemented by a number of filler bits without message significance so that each frame extends over a fixed number of clock cycles. If the composite word $W_i$ read out from a given access unit has a number of bits $z_i$ exceeding the number of bits $m_i$ allocated to that unit within a single frame, two or more frames will be required to complete the transmission of the word. In that event, the word is restarted in a subsequent frame in a time position which may be different from that in the initial frame in which all words start with bit No. 1 of the corresponding sequence. This initial position recurs with every $p^{th}$ frame where $p$ is the least common multiple of all the parameters $p_i$ representing the number of frames after which the generic word $W_i$ returns to its starting position. The parameter $p_i$ is given by $z_i/f_i$ where $f_i$ is the largest common factor of $z_i$ and $m_i$; thus, $p_i = z_i$ when $z_i$ and $m_i$ are relative primes.

A series of $p$ frames, referred to hereinafter as a superframe, can therefore be used for the purpose of establishing or restoring the proper synchronization between the scanning and allocation switches at the two terminals.

In accordance wjith a further feature of our invention, the number of frames $p$ constituting a superframe is registered by a first frame counter at the multiplexing terminal or input station and by a similar second counter at the demultiplexing terminal or output station. Each of these frames counters is stepped upon a count of every $q$ clock pulses, representing the total number of bits per frame, except for certain frames (e.g. every fourth) which periodically recur a whole number of times per superframe under the control of an ancillary counter operating in parallel with the frame counter and which serve for the insertion of an invariable synchronizing code in the frame, advantageously in lieu of the progressively changing identification code or addrss normally preceding the message bits thereof. If, at the output terminal, this synchronizing code is not received during the recurrent special frame marked by the ancillary counter, the allocation switch is reset to establish the desired synchronization. The terms "scanning switch" and "allocation switch" is used hereinabove include electronic circuitry as more fully described hereinafter.

Figure 2A:
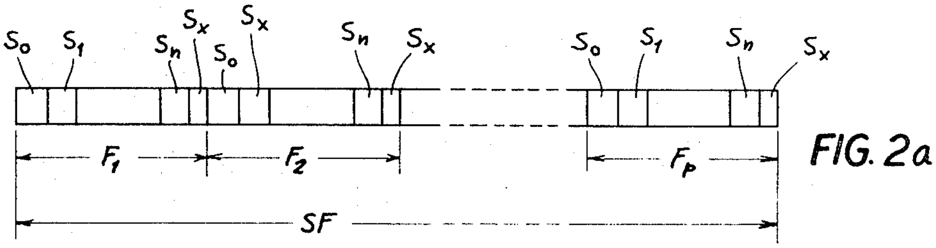
Figure 2B:
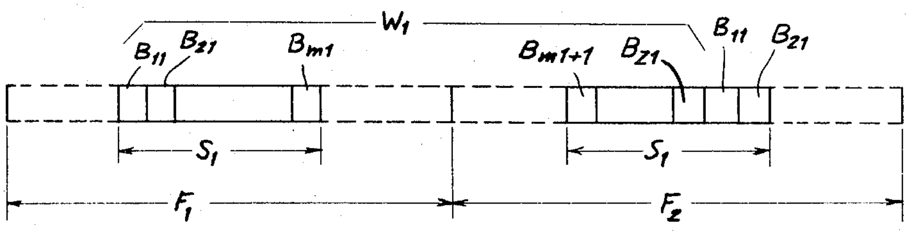
Figure 3:
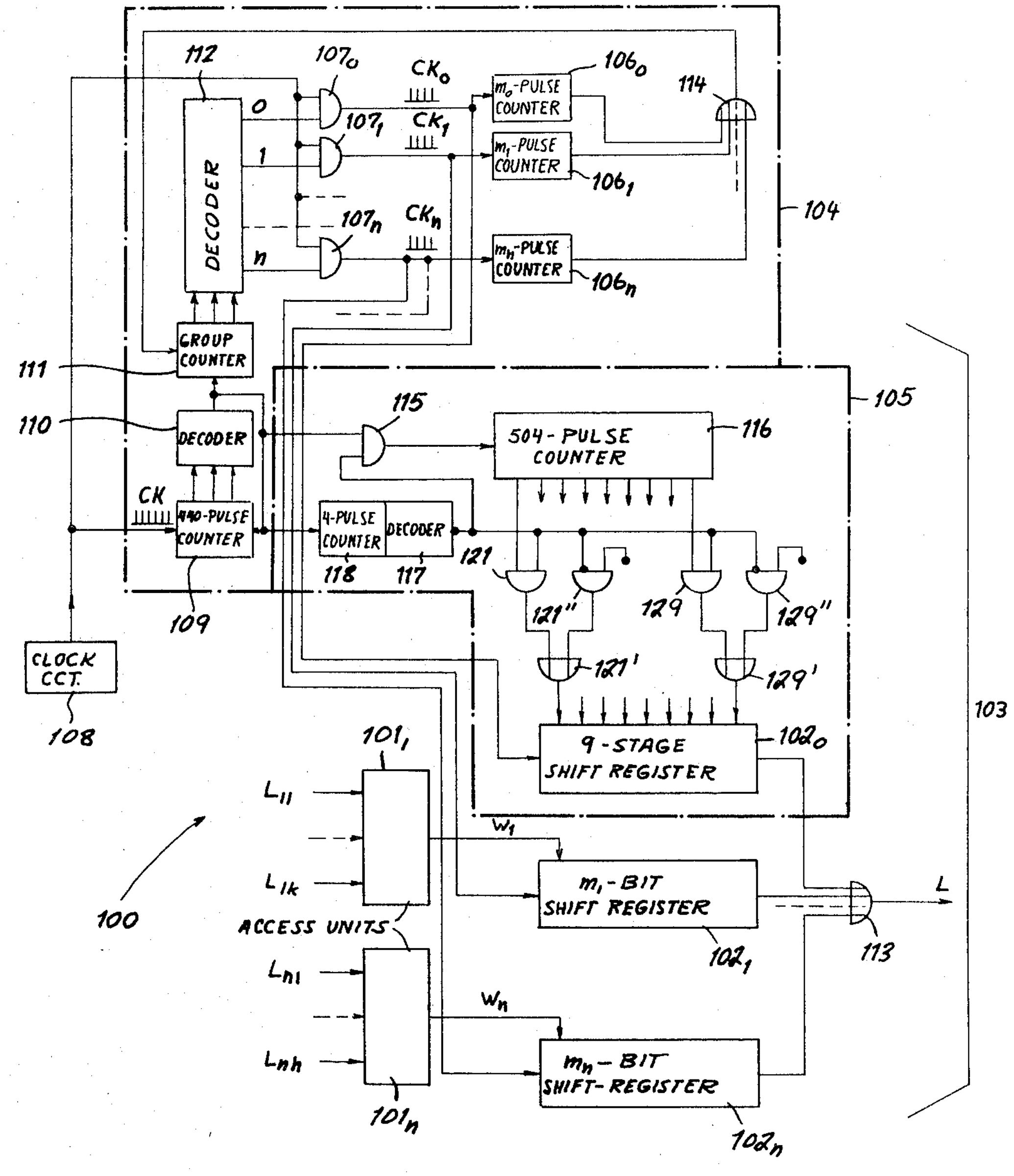
Figure 4:
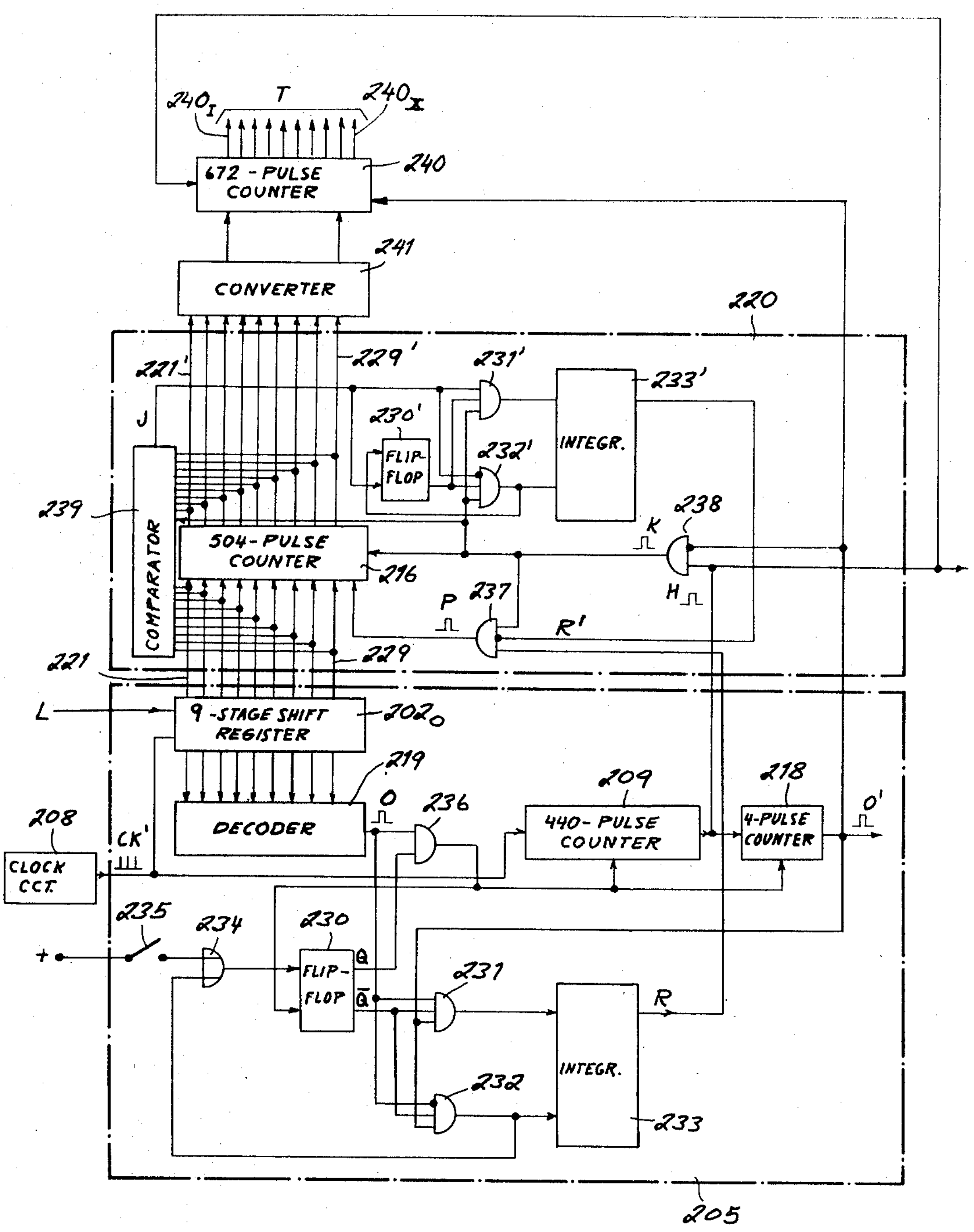
Figure 5:
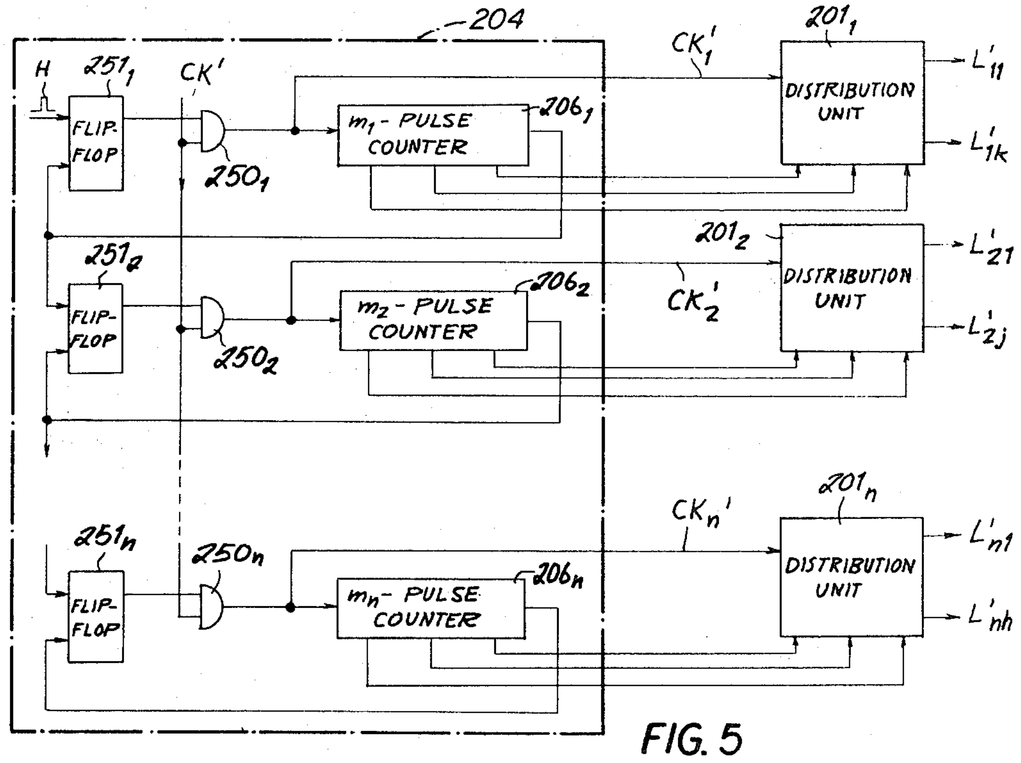
Figure 6:
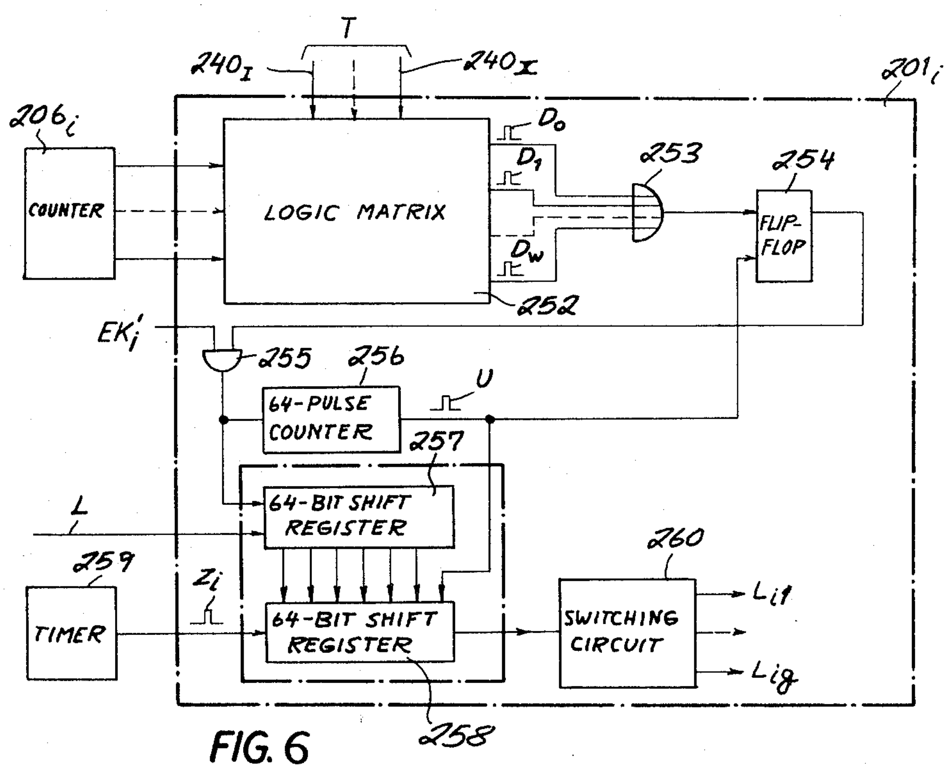

The invention will be more clearly understood from the following description of a preferred embodiment given with reference to the accompanying drawing in which:

FIG. 1 is a block diagram schematically illustrating a telecommunication system embodying our invention;

FIGS. 2*a* and 2*b* are time diagrams relating to the operation of the system of FIG. 1;

FIG. 3 is a more detailed circuit diagram of certain components of a multiplexing terminal forming part of the system of FIG. 1; and FIGS. 4 – 6 are similar circuit diagrams showing corresponding components at the associated demultiplexing terminal.

In FIG. 1 we have illustrated a telegraphic or data-transmitting system in which a communication path L, such as a wire circuit or a radio link, interconnects two terminal stations 100 and 200. Station 100, at the input end of transmission path L, serves a multiplicity of incoming lines $L_{11} - L_{1k}, \ldots L_{n1} - L_{nh}$ divided into a plurality of groups which terminate at respective access units $\mathbf{101}_1 - \mathbf{101}_n$, only the first and the last unit having been ilustrated. Each access unit works into a respective group register $\mathbf{102}_1 - \mathbf{102}_n$ designed for the temporary storage of a predetermined number of bits which may be different for each register, i.e., $m_1$ bits in the case of register $\mathbf{102}_1$ and $m_n$ bits in the case of register $\mathbf{102}_n$. These registers $\mathbf{102}_1 - \mathbf{102}_n$ form part of a multiplexer 103 and are periodically read by a scanner 104 diagrammatically illustrated as a switch; this scanner also samples the output of a similar register $\mathbf{102}_0$ which forms part of a synchronizing unit 105 and stores a number $m_0$ of bits whose value changes with each sweep of the scanner to identify consecutive frames in a superframe as defined above.

At the other terminal 200 an allocation switch 204 in a demultiplexer 203 operates in step with scanning switch 104 to direct the received bits from channel L to an address register $\mathbf{202_0}$, with a storage capacity $m_0$ bits, in a synchronizing unit 205 and to a plurality of distributing units $\mathbf{201_1}$ – $\mathbf{201_n}$ feeding respective groups of outgoing lines $L'_{11} - L'_{1k}, \ldots L'_{n1} - L'_{nh}$.

The several pulse sequences read out from registers $\mathbf{102_0}$ – $\mathbf{102_n}$ during each sweep of scanner 104 together constitute a frame containing one or more bits of each message fed in over lines $L_{11} - {}_{Lnh}$. A series of $p$ such frames, designated $F_1, F_2 \ldots F_p$ in FIG. 2*a*, constitute a superframe SF in which $n$ composite words, respectively synthesized by access units $\mathbf{101_1}$ – $\mathbf{101_n}$, recur a certain number of times. Each frame consists of a sequence of address bits $S_0$ from register $\mathbf{102_0}$ and bit sequences $S_1 - S_n$ from group registers $\mathbf{102_1}$ – $\mathbf{102_n}$, followed (if necessary) by one or more supplemental bits $S_x$ to complete the count of $q$ clock cycles for the frame. In this specific instance it is assumed that $q = 440$ and that $p = 672$.

FIG. 2*b* shows the spread of a word $W_1$ of $z_1$ bits (with $m_1<z_1<2m_1$), emitted by access unit $\mathbf{101_1}$, over two successive frames $F_1$ and $F_2$. In frame $F_1$ the first 2 bits $B_{11}$, $B_{21}$ of the word appear at the beginning of the sequence $S_1$ read out from group register $\mathbf{102_1}$ immediately after the reading of the address bits from register $\mathbf{102_0}$. This sequence ends with bit $B_{m1}$ and restarts in the next frame $F_2$ with bit $B_{m1+1}$, the final bit $B_{z1}$ of word $W_1$ appearing in an intermediate time position and being followed by the first bits $B_{11}$ and $B_{12}$ of the same word $W_1$ which recurs an integral number of times throughout the superframe SF. With proper choice of the frame count $p$, the recurring word $W_1$ ends with the last bit of sequence $S_1$ in the final frame $F_p$. The same is true of all words collected from the other message registers so that the next superframe is a structural duplicate of the one shown in FIG. 2*a*.

Naturally, the values of the individual bits of each word may change from one sampling to the next, though in certain instances (e.g., upon the reporting of instrument readings in telemetric systems) they could remain unchanged for prolonged periods.

FIG. 3 shows details of terminal 100 including the synchronizing unit 105 with its address register $\mathbf{102_0}$ as well as the multiplexer 103 with its group registers $\mathbf{102_1}$ – $\mathbf{102_n}$ and the associated scanner 104, the latter comprising a set of $n$ binary counters $\mathbf{106_0}$, $\mathbf{106_1}$ – $\mathbf{106_n}$ with a storage capacity of $m_0$, $m_1$, . . . $m_n$ bits, respectively. These counters are stepped by the outputs of respective AND gates $\mathbf{107_0}$, $\mathbf{107_1}$ – $\mathbf{107_n}$ which also work into reading inputs of the associated shift registers $\mathbf{102_0}$, $\mathbf{102_1}$ – $\mathbf{102_n}$ having the same storage capacity as the corresponding counters; in this particular instance, $m_0$ (the number of stages of address register $\mathbf{102_0}$) equals 9. Group registers $\mathbf{102_1}$ – $\mathbf{102_n}$ are periodically reloaded, at average rates $m_1V_o - m_nV_o$, from internal shift registers in units $\mathbf{101_1}$ – $\mathbf{101_n}$ which, however, have the capacity to accommodate composite words $W_1 \ldots W_n$ of $z_1 \ldots z_n$ bits, respectively; the message portions (e.g., characters) to be interleaved may be temporarily stored on a circulatng memory where they are sampled for transfer to the internal register in the desired order. The significant bits of each word are generally accompanied by one or more synchronizing bits as is well known per se.

It may be assumed, by way of example, that a typical access unit collects messages from 12 feeder channels which are sampled on a character-by-character basis, with 5 significant bits to a character, and that the composite word synthesized from these 60 bits also includes 4 additional bits as a service code to provide ancillary information such as the addresses of individual channels identified by start and stop signals. Thus, the number of significant bits $z_i$ of the composite word equals 64 in that instance.

A clock circuit 108 emits a train of pulses CK which establish the basic bit rate $v_o$ and are fed in prallel to one input of each AND gate $\mathbf{107_0}$ – $\mathbf{107_n}$ as well as to a stepping input of a 440-pulse counter 109 working into a decoder 110. At the end of every 440-pulse frame, decoder 110 zeroizes a group counter 111 which, through a decoder 112, successively energizes the other inputs of these AND gates to advance the corresponding counters $\mathbf{106_0}$ – $\mathbf{106_n}$. At the beginning of a frame, decoder 112 opens the gate $\mathbf{107_0}$ which is thus traversed by the clock pulses CK to generate a series of $m_0$ (here nine) stepping pulses $CK_0$ for counter $\mathbf{106_0}$ and for the serial read-out of register $\mathbf{102_0}$ to line L via an OR gate 113. Upon reaching the end of its count and returning to zero, counter $\mathbf{106_0}$ then energizes a stepping input of group counter 111 through an OR gate 114 which also receives the outputs of the other pulse counters $\mathbf{106_1}$ – $\mathbf{106_n}$. Decoder 112 thereupon cuts off the gate $\mathbf{107_0}$ and opens the gate $\mathbf{107_1}$ for a sequence of $m_1$ clock pulses CK which, as stepping pulses $CK_1$, advance the counter $\mathbf{106_1}$ and deliver the contents of register $\mathbf{102_1}$ through OR gates 113 to line L. In an analogous manner, counter $\mathbf{106_1}$ then steps the group counter 111 to switch to the next pulse counter and group register, and so forth, until at last the decoder 112 energizes its $n^{th}$ output to unblock the gate $\mathbf{107_n}$ whereupon pulses $CK_n$ step the counter $\mathbf{106_n}$ for $m_n$ clock cycles, reading out the bits stored in register $\mathbf{102_n}$. If the counter of 440 pulses has not been completed when the counter $\mathbf{106_n}$ returns to zero, decoder 112 is deactivated until decoder 110 resets the group counter 111 and re-energizes output lead No. 0.

The outupt pulses of decoder 110, fed back to a zeroizing input of coutner 109 to mark the end of each frame, are also supplied to an input of an AND gate 115 feeding the stepping input of a frame counter 116 whose nine stages, enough to register 504 pulses, feed corresponding stages of address register $\mathbf{102_0}$ through respective AND gates 121 – 129 (only two shown) and OR gates 121' – 129' in series therewith. The other inputs of AND gates 115 and 121 – 129 are connected to an inverting output of a decoder 117 associated with an ancillary counter 118 which is stepped from decoder 110 after every frame and whose maximum count, here 4, is an aliquot fraction of the number *p of frames per superframe. With every fourth frame, therefore, gate 115 blocks the transmission of a stepping pulse to frame counter 116 and also prevents the transfer of the frame count via AND gates 121 – 129 to address register* $\mathit{102_0}$; at the same time, another set of AND gates 121'' – 129'' with inverting inputs connected to the output of decoder 119 are opened to enter a special synchronizing code, such as eight zeroes or ones, in register $\mathbf{102_0}$ in lieu of the progressively increasing address count. Thus, the count in the address portion $S_1$ of each frame is interrupted 168 times in the course of a superframe SF so that the full count of 504 is reached only after 672 frames, counter 116 being then reset by an internal decoder (not shown) in the manner specifically illustrated for counter 109.

In FIG. 4 we have illustrated the synchronizing unit 205 of station 200 together with an associated phase-control network 220. Unit 205 comprises a 440-pulse counter 209 and an ancillary four-pulse counter 218 stepped by output pulses H thereof at the end of each frame, the corresponding decoding networks having been omitted for the sake of simplicity. Counter 209 is advanced by pulses CK' from a clock circut 208 operating in step with clock circuit 108 of FIG. 3. Clock pulses CK' are also fed to a nine-stage shift register $202_0$ which is loaded in series from line L and read out in parallel, under the control of these pulses, into a decoder 219 which, recognizes the recurrent synchronizing code in that register to generate an output pulse 0 which must coincide with a verification pulse 0' in the output of counter 218 if the two stations are properly in step. Pulses 0 and 0' are transmitted, together with the reset output Q of a flip-flop 230, to a pair of AND gates 231, 232 working into an integrating circuit 233, with inversion of pulse 0 in the input of gate 232. The output of the latter gate is fed back to the setting input of flip-flop 230 through an OR gate 234 which can also be energized by a manual start switch 235 from a source of operating voltage schematically indicated by a + sign. The set output Q of flip-flop 230 energizes one input of an AND gate 236 whose other input receives the pulse 0 from decoder 219 and which, upon conducting, zeroizes the counters 209 and 218 while also resetting the flip-flop.

At the start of operations, the setting of flip-flop 230 by means of switch 235 enables gate 236 to pass the first pulse 0 from decoder 219 whereupon counters 209 and 218 are restored to zero from whatever position they may have reached before. With flip-flop 230 now reset, the coincidence of pulses 0 and 0' four frame later opens the AND gate 231 so that integrator 233 is energized. If, however, the response of decoder 219 was not due to a synchronizing code but resulted from a fortuitous constellation of bits in a frame, then the next pulse 0' four frames later will generally not coincide with a pulse 0 so that AND gate 232 opens and discontinues the loading of integrator 233 while setting the flip-flop 230. The restoration of the counters 209 and 218 is then repeated until pulses 0 and 0' consistently coincide.

Upon a predetermined number of such coincidences in successive four-frame cycles, integrator 233 generates a consent signal R which is applied to an input of an AND gate 237 in network 220. This network further comprises a 504-pulse counter 216 which is stepped by output pulses K of an AND gate 238 receiving the end-of-frame pulses H from counter 209 on a non-inverting input and the verification pulses 0' from counter 218 on an inverting input so as to be blocked in the presence of these latter pulses. AND gate 238 also feeds a second input of AND gate 237 whose inverting third input receives a phasing signal R' from a trigger stage including a delay circuit 233' similar to integrator 233. Integrator 233' is controlled by a flip-flop 230' via AND gates 231' and 232' receiving the pulses K from gate 238 in parallel and, with relative inversion, a coincidence signal J from a comparator 239 connected to the nine stage outputs 221 – 229 of register $202_0$ and to corresponding stage outputs 221' –229' of counter 216. Stage outputs 221 – 229 terminate at respective stage inputs of counter 216 for the purpose of loading same, in parallel, under the control of a phasing pulse P from gate 237 whenerver the count of frames via pulses H, K does not match the address received directly from line L in register $202_0$. In that case, with signal J absent, integrator 233' has no output so that, upon proper synchronization of unit 205 as indicated by the signal R from circuit 233, gate 237 passes the first pulse K to generate the writing pulse P for entry of the contents of register $202_0$ in counter 216. Comparator 239 now emits the coincidence signal J with resetting of flip-flop 230', if it had previously been set, and with loading of integrator 233' through gate 231'. After several frames, integrator 233' gives rise to the phasing signal R' which thereupon blocks the gate 237 and which remains in effect also during those frames where, in the presence of verification pulses 0', the stepping pulses K are suppressed while the register $202_0$ contains the synchronizing code unrelated to the address stored in counter 216. If, however, counter 216 thereafter falls out of step with counter 116 of station 100, the next pulses K open the AND gate 232' in lieu of gate 231' for a sufficient number of frame periods to discontinue the phasing signal R' so that another writing pulse P modifies the reading of the counter in accordance with the contents of register $202_0$.

The stage outputs 221' – 229' of counter 216 also lead to a converter 241 which translates their stage of energization into a corrected count giving the true number of frames in a 672-frame superframe, to be registered in a 672-pulse counter 240. Thus, converter 241 increases the reading of counter 504 by one after every fourth frame, changing 5 to 6, 9 to 11, 13 to 16 and so forth, so that both counters 216 and 240 reach the limit of their capacity at the same time. Counter 240 can also be stepped by pulses 0' at the beginning of every fourth frame, i.e., whenever the reading of counter 216 remains unchanged; this counter has ten stage out puts $240_I$–$240_X$ multiplied to the several distributing units $201_1$ – $201_n$ (FIG. 1) of station 200 to deliver timing singals T thereto as illustrated for one such station, generically designated $201_i$, in FIG. 6.

The circuit arrangement of FIG. 5 represents the allocation switch 204 of FIG. 1. This switching network comprises $n$ bit counters $206_1$, $206_2$, . . . $206_n$ with the same capacity as the corresponding counters $106_1$ – $106_n$ of FIG. 3, i.e., of $m_1$, $m_2$, . . . $m_n$ pulses, respectively. Each counter is stepped, during the part of a frame alloted to it, by pulses $CK_1'$, $CK_2'$, . . . $CK_n'$ derived from the clock pulses CK' passing through an associated AND gate $250_1$, $250_2$, . . . $250_n$ which has a second input energized by the set output of a respective flip-flop $251_1$, $251_2$, . . . $251_n$. The first flip-flop in the series, i.e., bistable circuit $251_1$, is periodically set by the end-of-frame pulses H from counter 209 (FIG. 4) and is reset, after a count of $m_1$ clock cycles, by the output of counter $206_1$ restoring itself to zero, the same output pulse setting the next flip-flop $251_2$ whereupon counter $206_2$ begins its run for $m_2$ clock pulses. After the final count of $m_n$ clock cycles by counter $206_n$, network 204 remains idle for a period measured by the supplemental bits $S_x$ of FIG. 2a until the next pulse H appears in the input of flip-flop $251_1$. Stepping pulses $CK_1'$, $CK_2'$, . . . $CK_n'$ are also delivered to distributing units $201_1$, $201_2$, . . . $201_n$ serving outgoing lines $L'_{11}$ – $L'_{1k}$, $L'_{21}$ – $L'_{21}$ – $L'_{2j}$, . . . $L'_{n1}$ – $L'_{nh}$, respectively, together with the individual stage outputs of the corresponding counters.

In FIG. 6 we have shown the generic distributing unit 201$_i$ receiving the stepping pulses $CK_i'$ from switch 204 (FIG. 5), the timing signals T of counter 240 (FIG. 4) from leads 240$_I$ – 240$_X$ and correlated signals from the associated bit counter 206$_i$. The stage outputs of this bit counter as well as the leads 241 – 249 terminate at a logic matrix 252 which establishes, from the relationship discussed in conjunction with FIG. 2*b*, the precise instants when a word $W_i$ allocated to this distributing unit begins. At these instants, occurring a predetermined number of times throughout each superframe SF, matrix 252 emits respective start-of-word pulses $D_0, D_1, \ldots D_w$ which are transmitted through an OR gate 253 to the setting input of a flip-flop 254 working into an AND gate 255 also receiving the stepping pulses $CK_i'$. AND gate 255 feeds a final 64-pulse counter 256 which, on reaching its full count, emits a pulse U which resets the flip-flop 254. Since, as herein assumed, the word $W_i$ allocated to unit 201$_i$ consists of 64 significant bits followed by a small number of sync bits, flip-flop 254 is reactivated shortly thereafter to start a new pulse count. Meanwhile, the stepping pulses $CK_i'$ traversing the gate 255 have also reached a writing input of a 64-bit shift register 257 causing the inscription therein, directly from line L, of all the bits of word $W_i$ in one or more sequences of up to $m_i$ bits. The occurrence of end-of-word pulse U transfers the contents of register 257, in parallel, to corresponding stages of a similar buffer register 258 from which they are subsequently read out, bit by bit, under the control of a train of locally generated pulses $Z_i$ from a timer 259 having a cadence $m_i v_o$. The entire word $W_i$ thus reconstituted is thereby delivered to a switching circuit 260 which directs the several constituent characters thereof, bit by bit or character by character, to the several outgoing lines $L_{i1}$ – $L_{iq}$, e.g., with the aid of a circulating memory.

Within the composite word originating at any access unit, the order of occurrence of the message characters from its several feeder channels may be changed at will (if the characters are accompanied by suitable information to identify these channels) without affecting the mode of operation of the overall system. The system can also operate, albeit with reduced efficiency, if the number of active access and distributing units is less than the maximum number *n* for which it has been designed.

We claim:

1. A time-division-multiplex system for the transmission of binary message signals from a multiplicity of incoming channels to a like multiplicity of outgoing channels over a common connecting channel extending between an input terminal and and output terminal provided with sources of synchronized clock pulses, comprising:

a plurality of access units at said input terminal each serving a respective group of said incoming singals for combining a certain number of bits from each channel of the associated group into a composite word of $z_i$ bits occurring at a rate $m_i v_0$ where $v_0$ is a fixed basic cadence established by said clock pulses and $m_i$ is an integral factor individual to the group, $m_i$ being different for at least some of said access units;

multiplexing means at said input terminal including a set of group registers for temporarily storing a sequence of $m_i$ bits respectively received from each access unit during a frame period of predetermined duration first pulse-counting means for said clock pulses, and first switch means controlled by said first pulse-counting means for cyclically sampling said group registers to combine the contents thereof into a frame in which the several bit sequences occupy predetermined relative time positions but in which a recurrent word of $z_i \neq m_i$ bits from at least one access unit starts in successive frames in different time positions within a sequence;

first frame-counting means at said input terminal responsive to said clock pulses for determining the completion of a superframe consisting of a series of *p* frames, *p* being the number of frames necessary to make all words start again in their original relative time position;

a plurality of distributing units at said output terminal each associated with one of said access units and serving a respective group of outgoing channels respectively assigned to the incoming channels served by the associated access unit;

demultiplexing means at said output terminal including second pulse-counting means for said clock pulses and second switch means in step with said first switch means, controlled by said second pulse-counting means, for allocating the bit sequences of each frame to the corresponding distributing units;

second frame-counting means at said output terminal for actuating said second pulse-counting means to generate within the duration of each superframe a series of timing signals indicating to each distributing unit the start of the word allocated thereto; and synchronizing means at said output terminal responsive to signals from said input terminal for maintaining said second frame-counting means in step with said first frame-counting means.

2. A system as defined in claim 1, further comprising a first address register at said input terminal controlled by said first frame-counting means for storing an identification code progressively changing throughout each superframe, said first address register being periodically scannable by said first switch means for including said identification code in each frame along with said bit sequence, and a second address register at said output station connected to receive said identification code from said common channel, said synchronizing means being controlled by said second address register.

3. A system as defined in claim 2 wherein said input terminal further comprises a first pulse counter connected to be stepped by said clock pulses, said first frame-counting means including a first frame counter and a first ancillary counter connected to be stepped by said first pulse counter after every q clock pulses marking the completion of a frame, said output terminal further comprising a second pulse counter connected to be stepped by said clock pulses, said second frame-counting means including a second frame counter and a second ancillary counter connected to be stepped by said second pulse counter after every *q* clock pulses, said first and second frame counters establishing said progressively changing identification code, said first ancillary counter being periodically operative upon a count of a limited number of frames to insert an invariable synchronization code in a frame transmitted over said common channel, said limited number being an aliquot fraction of the number p of frames per superframe, said second ancillary counter being periodically operative upon a count of said limited number of frames to generate a verification pulse, said synchronizing means comprising circuitry for restoring said second frame counter and ancillary counter to zero in response to noncoincidence of said verification pulse with reception of said synchronization code over said common channel.

4. A system as defined in claim 3 wherein each of said ancillary counters is connected to halt the advance of the associated frame counter upon the count of said limited number of frames, said first frame-counting means including loading means for introducing said synchronization code into said first address register in lieu of said identification code under the control of said first ancillary counter, said circuity including a decoder connected to said second address register for detecting the presence of said synchronization code therein.

5. A system as defined in claim 4, further comprising writing means at said output terminal operable to transfer the contents of said second address register to said second frame counter, comparison means connected to said second address register and to said second frame counter for determining the existence of a match between the contents thereof, and trigger means connected to said comparison means for making said writing means effective in the case of a mismatch of said contents.

6. A system as defined in claim 5 wherein said synchronizing means comprises a generator of consent signals for enabling the operation of said writing means only upon recurrent coincidence of said verification pulse with the presence of said synchronization code in said second address register.

7. A system as defined in claim 5 wherein said trigger means includes delay means for preventing the operation of said writing means in the case of a mismatch due to the presence of said synchronization code in said second address register

8. A system as defined in claim 4 wherein said second frame-counting means further includes a third frame counter with a capacity *p* and conversion means linking said second frame counter with said third frame counter for inscribing in the latter the true count of frames per superframe.

9. A system as defined in claim 3 wherein said second pulse-counting means comprises a plurality of multistage bit counters, one for each distributing unit, interconnected to operate in cyclic succession in response to trains of clock pulses corresponding to the number of bits in the bit sequences allocated to the respective distributing units, each of said bit counters having a plurality of stage outputs terminating at the associated distributing unit, the latter including a logic matrix connected to said stage outputs and to said second frame-counting means for receiving said timing signals therefrom to generate start-of-word pulses during energization of certain of said stage outputs in predetermined frames of a superframe, each distributing unit further including storage means with a capacity of $z_i$ bits connected to said common channel for loading under the control of said start-of-word pulses and read-out means for directing the constituent portions of a composite word in said storage means to respective outgoing channels of the associated group.

10. A system as defined in claim 9 wherein each distributing unit comprises a final counter of $m_i$ clock pulses connected to operate simultaneously with the associated bit counter, said storage means including a first shift register connected to be serially loaded from said common channel during operation of said final counter and a second shift register connected to be loaded in parallel from said first shift register under the control of said final counter upon the entry of an entire word in said first register, said read-out means including a source of stepping pulses of cadence $m_i v_o$ connected to said second shift register for serially discharging same.

* * * * *